US007080823B1

(12) United States Patent
Triplett

(10) Patent No.: US 7,080,823 B1
(45) Date of Patent: Jul. 25, 2006

(54) ENGINE HOIST MOUNTING A TRANSMISSION ADAPTER

(76) Inventor: Dennis Triplett, 161 Meldrim Rd., P.O. Box 673, Bloomingdale, GA (US) 31302

( * ) Notice: Subject to any disclaimer, the term of this patent is extended or adjusted under 35 U.S.C. 154(b) by 159 days.

(21) Appl. No.: 10/869,376

(22) Filed: Jun. 17, 2004

(51) Int. Cl.
*B60P 1/48* (2006.01)

(52) U.S. Cl. ...................................................... 254/8 B

(58) Field of Classification Search ................ 254/8 R, 254/8 B, 133, 134, 2 R, 2 B, DIG. 17
See application file for complete search history.

(56) References Cited

U.S. PATENT DOCUMENTS 2,747,837 A 5/1956 Turner
2,838,278 A 6/1958 Johnsen
5,139,233 A 8/1992 Goss
6,109,593 A * 8/2000 Craychee .................... 254/8 B
6,120,236 A 9/2000 Smith
6,457,700 B1 * 10/2002 Hong ......................... 254/8 B

* cited by examiner

*Primary Examiner*—Robert C. Watson
(74) *Attorney, Agent, or Firm*—William B. Noll

(57) ABSTRACT

An adapter mechanism for removably mounting to a ground supported hoisting device to facilitate the removal, repair and reinstallation of a weighted mass, such as a vehicle transmission. The adapter mechanism includes an open peripheral frame for removable mounting to the hoisting device, and plural, laterally movable, pivotally mounted supports, pivotal about 360 degrees to provide support and balance to the transmission. Further, the adapter mechanism includes a strap encircling mechanism that includes a flexible U-shaped channel member that conforms to the secured transmission.

6 Claims, 5 Drawing Sheets

ENGINE HOIST MOUNTING A TRANSMISSION ADAPTER

FIELD OF THE INVENTION

This invention is directed to the field of engine hoist transmission device for mounting to a ground supported engine hoist for removing, performing work and reinstalling a transmission on a vehicle, but more particularly to an attachment having an opened floor about a peripheral frame mounting plural pivotal transmission supporting members.

BACKGROUND OF THE INVENTION

The present invention relates to an attachment for mounting to a ground supported, mobile engine hoist to effect removal and the reinstallation of a vehicle transmission. Engine hoists of the type to which this invention is directed includes a relatively long low chassis mounted on wheels or rollers for mobility. From one end a pivotally connected, load lifting mechanism is provided, whereby to raise and engage a load, i.e. transmission. Typically, the component for contacting the load is a saddle or platform.

There are a number of prior art devices or adapters that were developed for use with an engine jack or hoist to assist mechanics in removing, performing work thereon, and reinstalling a vehicle transmission. Several of such devices or adapters are described in the following U.S. patents:

a.) U.S. Pat. No. 6,120,236, to Smith, teaches an engine hoist transmission attachment for enabling an engine hoist to remove and install a transmission. The attachment includes an adapter portion coupling with an existing engine hoist. The adapter portion includes a leveling arm positioned essentially parallel to a lifting arm of the engine hoist. A transmission stand is coupled with the adapter portion and is adapted for supporting a transmission thereon. The transmission stand includes an upper plate supporting the transmission thereon.

b.) U.S. Pat. No. 5,139,233, to Goss, discloses a lift jack adapter for cradling a heavy irregularity shaped object, such as an automotive transmission that includes a rigid base for mounting to a lift jack and pairs of laterally spaced arms extending up from the base, the upper ends of those arms are terminated by flanges for engaging the underside of the object cradled in the adapter. These flanges are fastened to the object and positively connect the object to the adapter so that one can raise and lower the object using the jack and repair the object in relative safety.

c.) U.S. Pat. No. 2,838,278, to Johnsen, relates to an adapter for a transmission jack that includes a square planar plate mounting plural, pivotal members at the respective corners of the planar plate.

d.) U.S. Pat. No. 2,747,837, to Turner, is directed to a transmission lifting attachment for a mobile lifting jack. The attachment includes a column mounted on the saddle of the lifting jack and extending vertically therefrom, a table mounted on the column for universal above the upper end thereof. Further, means are carried by the column and operatively engaged with the table for holding the table in a selected position adjacent the upper end of the column, and work holders carried by the table for adjustment thereon.

The foregoing patents are just several exemplary references on the efforts of different inventors to design and construct a suitable adapter attachment for use with a mobile lifting jack for removing and reinstalling a vehicle transmission. However, such references fail to show an adapter attachment that securely holds the vehicle transmission while allowing full access to the transmission positioned on the adapter attachment. The manner by which the present invention achieves these goals will become more apparent in the description which follows, especially when read in conjunction with the accompanying drawings.

SUMMARY OF THE INVENTION

This invention teaches an adapter member for use with a floor supported hoisting device having a floor supported frame, a generally central post extending vertically from the floor supported frame and terminating in a free end. To the free end a pivotally mounted arm extends outwardly therefrom, where the pivotally mounted arm may include a telescopically movable end, and a hydraulic piston to raise and lower the pivotally mounted arm. The adapter member, for mounting to the telescopically movable end, is sized to receive and support a weighted mass, such as a vehicle transmission. The adapter member comprises a generally rectangular peripheral frame having an upper planar surface and a lower planar surface to define a broad opening between the upper and lower surface. Secured to the lower planar surface is a channel member, for removably mounting the adapter member to the telescopically movable end. Further, plural upstanding members, extending upwardly from the upper planar surface are provided. The upstanding members are pivotal throughout 360 degrees and arranged about the peripheral frame to contact and balance the transmission. Finally, an encircling strap mechanism is included to override the transmission to secure same to the peripheral frame.

Accordingly, a feature of this invention is the provision of an improved adapter mechanism for a ground supported lifting hoist, where the adapter mechanism has particular utility for supporting and accessing a vehicle transmission.

Another feature hereof is an adapter mechanism composed of plural metal bars fabricated into a rectangular shape to provide a broad central opening for accessing a cradled transmission on the fabricated rectangular shape.

A further feature of the invention lies in the use of plural, upstanding, pivotal and radially adjustable support members for securing and balancing a transmission.

These and other features of the invention will become clearer from the following specification and accompanying drawings, especially by those skilled in the art.

DETAILED DESCRIPTION OF PREFERRED EMBODIMENT

Figure 1:
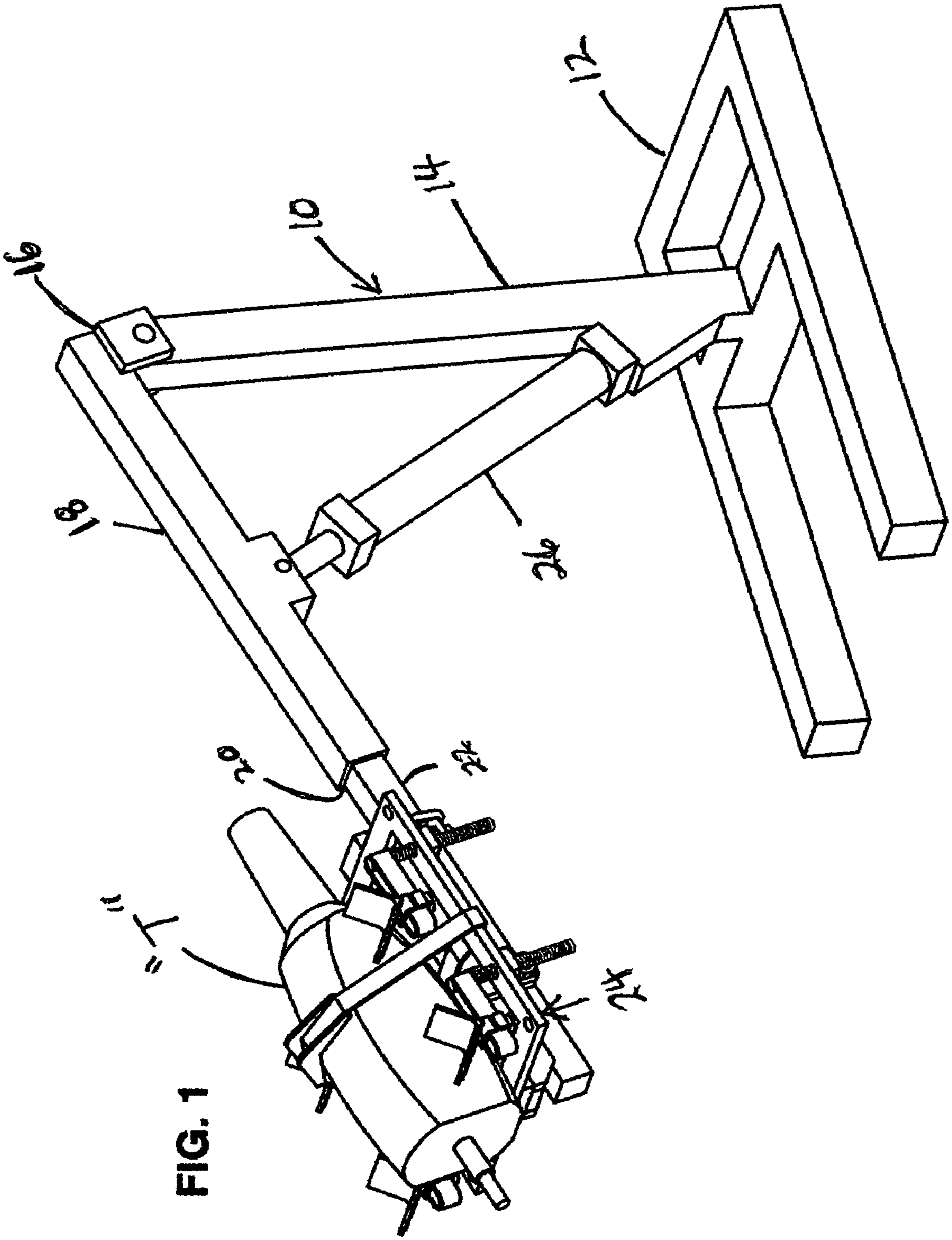
FIG. 1 is a perspective view of a typical, floor supported hoisting device, as known in the art, further showing a transmission secured to a preferred adapter member according to the present invention, where the adapter member is removably secured to an extension arm of the hoisting device.

This invention is directed to an adapter mechanism for use with a floor supported engine hoisting device, where the hoisting device has particular utility, when positioned under a vehicle, to remove, repair and reinstall the vehicle's transmission. The adapter mechanism will now be described with regard to the several Figures, where like reference numerals represent like components or features throughout the various views.

Turning first to FIG. 1, to help in understanding the invention, and to show its preferred use in handling a vehicle transmission, there is illustrated a conventional type engine hoisting device 10 that includes a ground supporting frame 12, though not shown may include plural wheels or rollers to facilitate its mobility. Upstanding from the frame 12 is a vertical member 14 terminating at its upper end 16 with a pivotal arm 18 extending angularly therefrom. The free end 20 of the pivotal arm may include a telescopic extension 22 for removably mounting the adapter mechanism 24, as more clearly described in FIGS. 2 through 5. A final component of the hoisting device 10 is a hydraulic piston 26 to raise and lower the pivotal arm 18 and telescopic extension 22. While details of the adapter mechanism 24 will become clearer hereinafter, FIG. 1 shows an exemplary vehicle transmission "T" secured to the adapter mechanism 24.

With the foregoing background, FIGS. 2 through 5 illustrate details of the adapter mechanism 24. Said mechanism comprises a peripheral frame 30 formed by a pair of side metal bars 32, and front and rear metal bars 34, 36, respectively, joined to the side metal bars, such as by welding, to define a generally rectangular shape with a broad opening 38 therewithin, where such opening allows for the easy access to the transmission and the performance of work thereon. Since said peripheral frame must be strong and rigid, preferably the respective bars are fabricated from steel. The peripheral frame is characterized by an upper planar surface 40 and a lower planar surface 42. The peripheral frame 30 is mounted to a longitudinally oriented channel frame support 44 along the lower planar surface 42, where the channel frame support functions to removably secure the adapter mechanism to the telescopic extension 22 of the hoisting device 10. Specifically, the channel frame support 44 is characterized by a pair of spaced apart, downwardly extending side walls, where the distance therebetween is sized to sidably engage the lateral dimension of the telescopic extension 22.

Figure 2:
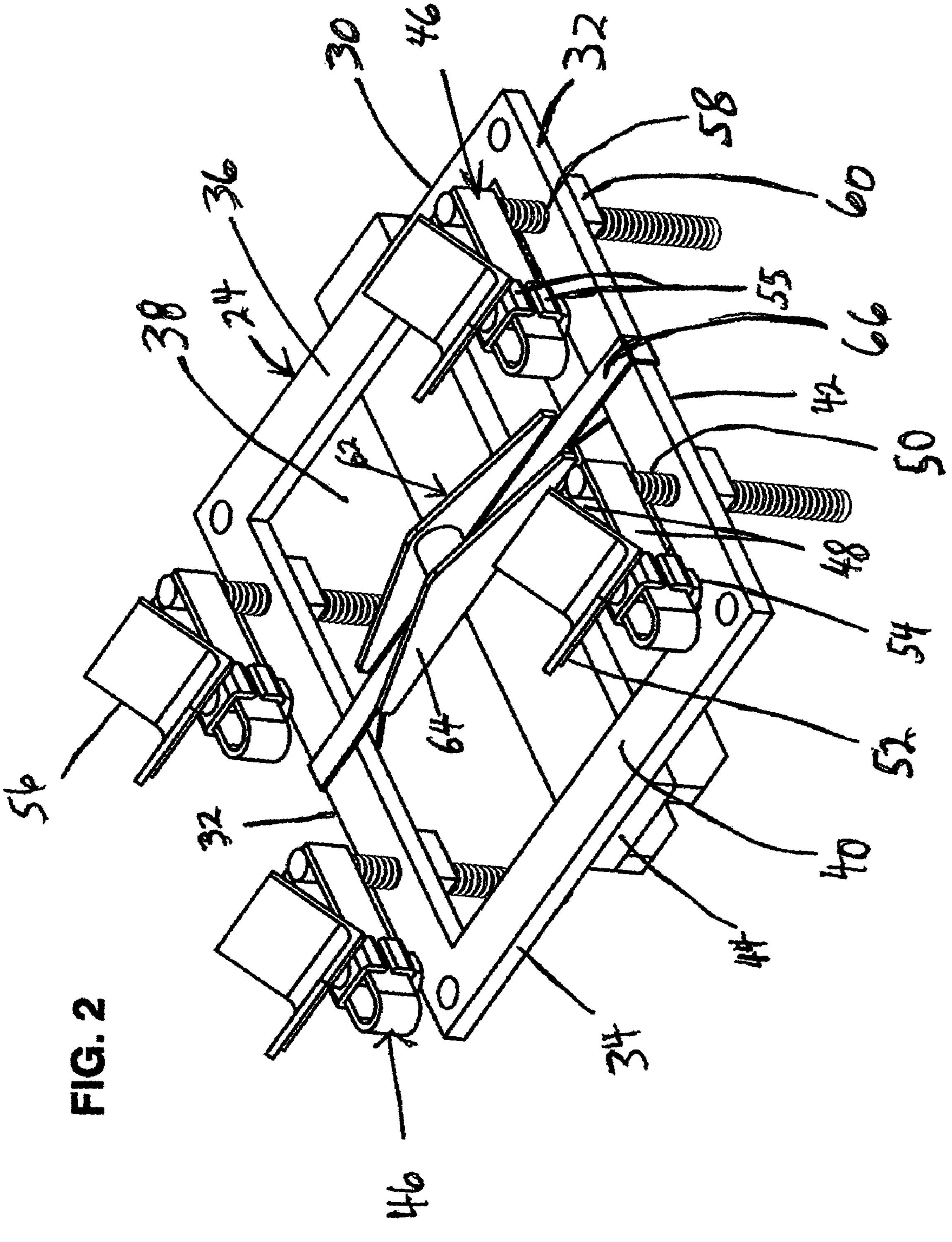
FIG. 2 is an enlarged perspective view of the preferred adapter member hereof, less an exemplary transmission.
Figure 3:
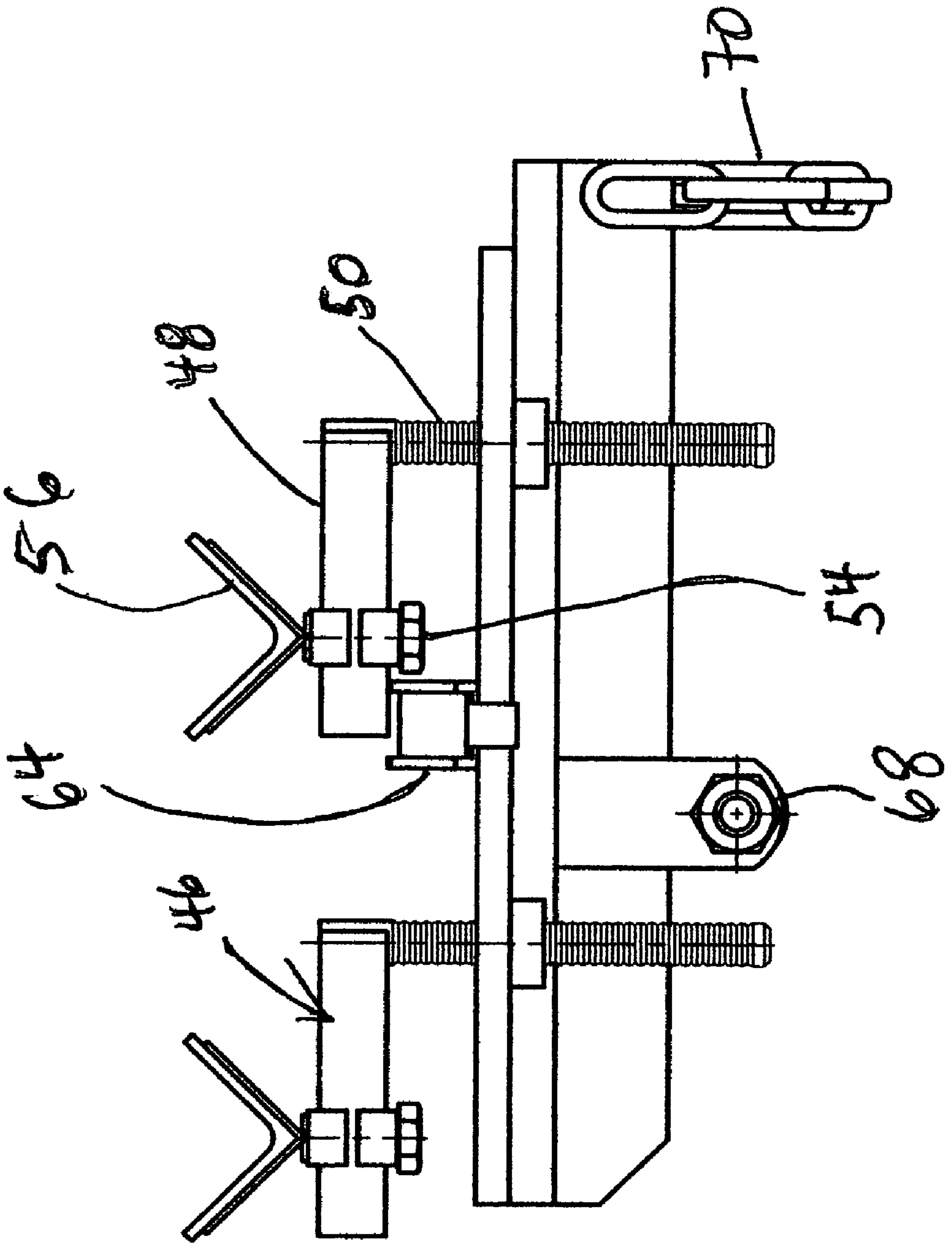
FIG. 3 is a side view of the adapter member of FIG. 2.
Figure 4:
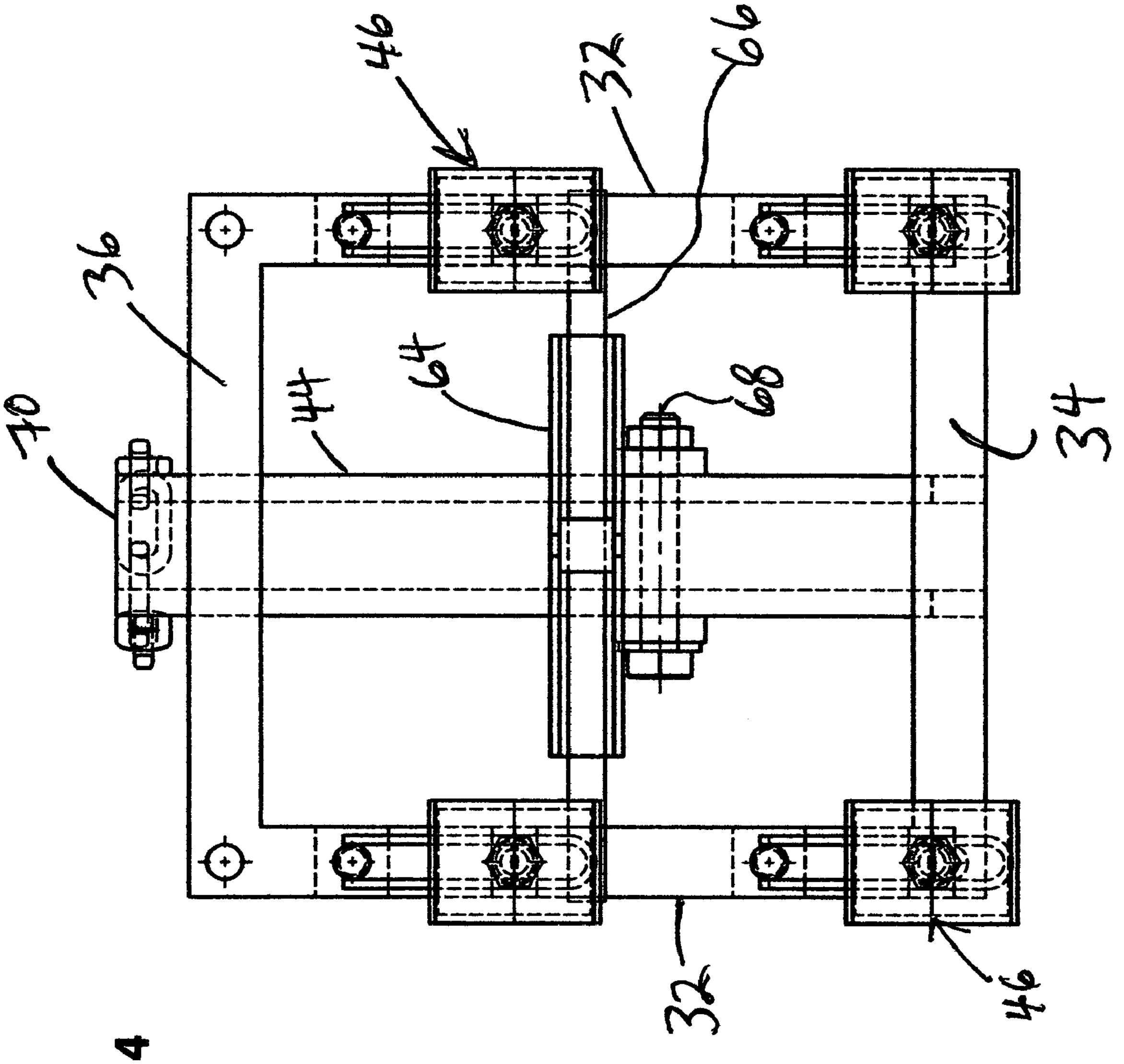
FIG. 4 is a top view thereof.
Figure 5:
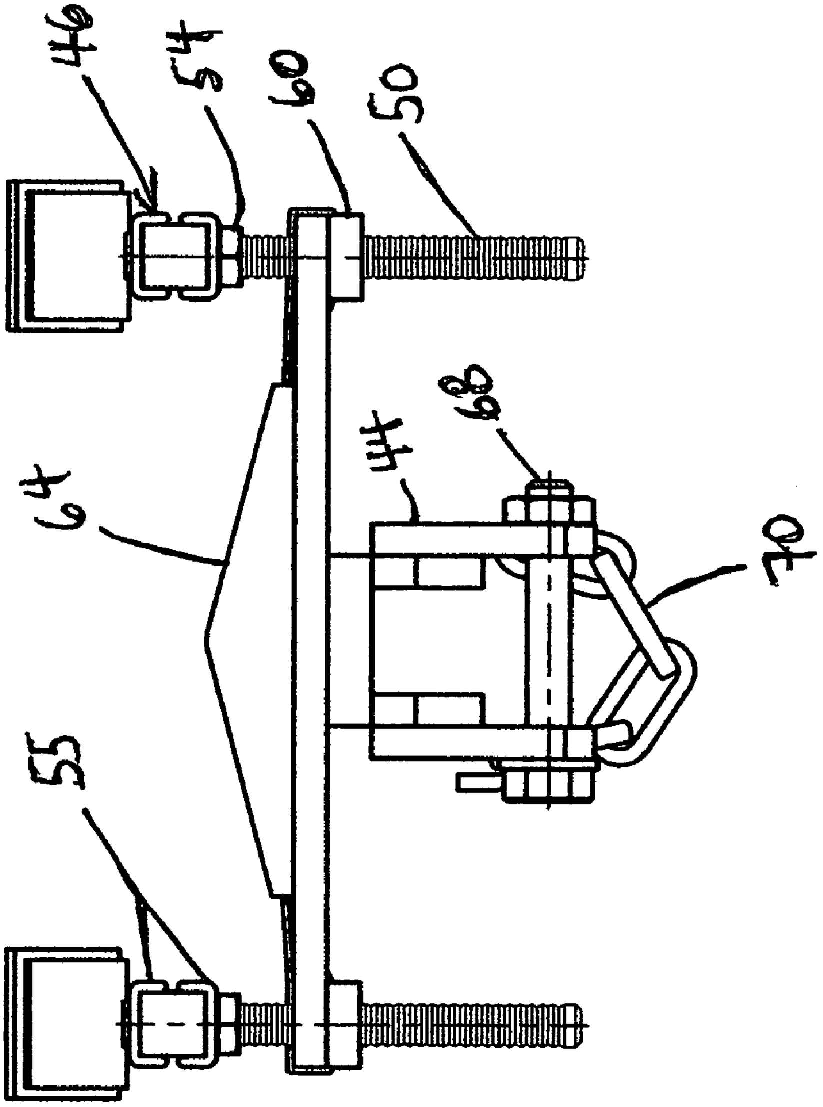
FIG. 5 is a front end view thereof.

The adapter mechanism 24 further includes plural L-shaped, pivotal support members 46, preferably mounted for pivotal movement relative to the respective side metal bars 32. Each said support member 46 comprises a pair of spaced apart, lateral members 48 secured, such as by welding, to a vertical, threaded pivoting rod 50, the mounting of which will be discussed later. For selective positioning along said lateral members 48 is an upstanding support arm 52, where the support arm may be selectively positioned by sliding along the lateral members 48, then fixed in position by threaded member 54. The support arm 52 may be mounted on a pair of U-shaped slide members 55, then tightened by threaded member 54. A preferred shape for said support arm 52 is best seen in FIG. 5, specifically a V-shape having a planar edge 56, as seen in FIG. 2 to provide a convenient contact surface against the weighted mass, i.e. vehicle transmission "T".

Returning to the peripheral frame 30, pivotal movement, preferably throughout 360 degrees, is accomplished by the cooperative rotational movement of the threaded, pivoting rod 50 in a complementary threaded opening 58 in the peripheral frame, specifically within the side metal bars 32. For stability, the respective openings 58 may include an added threaded member 60 welded to the lower planar surface 42.

A further feature of the adapter mechanism 24 is an encircling strap mechanism 62 to further secure the transmission to the peripheral frame 30. The mechanism 62 includes an elongated U-shaped channel member 64, preferably formed of a flexible material, such as an elastomeric material, i.e. rubber, to allow the channel member to conform readily to the exterior of the transmission "T", see FIG. 1. Cooperating with the channel member 62 is a strap 66 that may be tightened about the secured transmission by means known in the art, see FIG. 4.

Finally, the underside of the channel frame support 44 may be provided with means to removably secure the adapter mechanism 24 to the telescopic extension 22. Specifically, a first such means is a threaded bolt 68 that may be secured to the extension 22, and a chain 70, see FIGS. 3 and 4.

It is recognized that changes, variations and modifications may be made to the adapter mechanism of this invention without departing from the spirit and scope thereof. Accordingly, no limitation is intended to be imposed thereon except as set forth in the appended claims.

I claim:

1. In combination with a floor supported hoisting device having a floor supported frame, a generally central post extending vertically from said floor supported frame and terminating in a free end, a pivotally mounted arm extending outwardly from said free end, where said pivotally mounted arm includes a telescopically movable end, and a hydraulic piston to raise and lower said pivotally mounted arm, the improvement comprising an adapter member for mounting to said telescopically movable end, where said adapter member is sized to receive and support a weighted mass, said adapter member comprising:

a.) a generally rectangular peripheral frame having an upper planar surface and a lower planar surface and defining an opening between said upper and lower surfaces;

b.) a channel member, secured to said lower planar surface, for removably mounting to said telescopically movable end;

c.) plural, upstanding members, extending upwardly from said upper planar surface, where each said upstanding member comprises a pair of parallel, spaced apart members, where respective first ends of said spaced apart members are mounted to a pivotal rod which in turn is movable within an opening in the wall of said peripheral frame, and an angled support selectively positionable along said spaced apart members, said upstanding members being pivotal throughout 360 degrees and arranged about said peripheral frame to contact and balance said weighted mass; and, d.) an encircling strap mechanism to override said weighted mass to secure same to said peripheral frame.

2. The combination according to claim 1, wherein said angled support is V-shaped having at least one planar edge.

3. The combination according to claim 1, wherein said encircling strap mechanism includes a flexible channel and a strap positioned within said channel, where said channel may be flexed in contact with said weighted mass.

4. The combination according to claim 1, wherein said peripheral frame comprises a pair of side, spaced apart metal bars, and front and rear metal bars joined to said spaced apart metal bars to define a rectangle having a broad access opening therewithin.

5. The combination according to claim 1, wherein said encircling strap mechanism includes an elongated, U-shaped, flexible channel member and an encircling strap cooperating therewith.

6. The combination according to claim 5, wherein said U-shaped channel member is formed of an elastomeric material, where the channel member is straight in a relaxed condition, and flexed to conform to said weighted mass in a tightened condition.

* * * * *